United States Patent
Gershzohn

(10) Patent No.: US 9,569,323 B1
(45) Date of Patent: Feb. 14, 2017

(54) FLIGHT DECK CONTROL CUEING

(75) Inventor: Gary R. Gershzohn, Laguna Hills, CA (US)

(73) Assignee: THE BOEING COMPANY, Chicago, IL (US)

(*) Notice: Subject to any disclaimer, the term of this patent is extended or adjusted under 35 U.S.C. 154(b) by 782 days.

(21) Appl. No.: 12/612,853

(22) Filed: Nov. 5, 2009

(51) Int. Cl.
G06F 11/22 (2006.01)
G06F 11/32 (2006.01)
B64D 43/00 (2006.01)

(52) U.S. Cl.
CPC .......... *G06F 11/2257* (2013.01); *G06F 11/32* (2013.01); *B64D 43/00* (2013.01)

(58) Field of Classification Search
CPC .............. G06F 11/2257; G06F 11/0748; G06F 11/2273; B64G 1/22; G01C 23/005; G05B 23/027; G05D 1/0055
USPC ............... 716/709, 771, 812, 817, 822, 829, 855,716/970; 715/709, 771, 812, 817, 822, 829, 715/855, 970, 243, 710
See application file for complete search history.

(56) References Cited

U.S. PATENT DOCUMENTS

| | | | |
|---|---|---|---|
| 2,718,628 A * | 9/1955 | Bartlett et al. ................. | 340/945 |
| 5,454,074 A * | 9/1995 | Hartel et al. .................. | 715/710 |
| 5,522,026 A * | 5/1996 | Records et al. ............... | 715/710 |
| 5,566,339 A * | 10/1996 | Perholtz et al. .............. | 713/340 |
| 6,262,720 B1 * | 7/2001 | Jeffrey et al. ................. | 715/710 |
| 6,286,064 B1 * | 9/2001 | King et al. ....................... | 710/67 |
| 6,609,082 B2 * | 8/2003 | Wagner .......................... | 702/182 |
| 6,696,980 B1 | 2/2004 | Langner et al. | |
| 6,753,891 B1 | 6/2004 | Choham et al. | |
| 7,260,453 B2 * | 8/2007 | Poier et al. ........................ | 701/1 |
| 7,735,005 B2 * | 6/2010 | Holder et al. ................. | 715/243 |
| 2006/0246955 A1* | 11/2006 | Nirhamo et al. ............. | 455/566 |
| 2007/0099161 A1* | 5/2007 | Krebs et al. .................. | 434/322 |

OTHER PUBLICATIONS

Daniel Boorman, Author of Proceeding entitled, "Reducing Flight Crew Errors and Minimizing New Error Modes with Electronic Checklists." Also published in Proceedings of the International Conference on Human-Computer Interaction in Aeronautics, Toulouse, France, Sep. 27-29, 2000; pp. 1-7.

* cited by examiner

*Primary Examiner* — Andrew Tank

(57) ABSTRACT

Technologies are described herein for cueing a pilot to flight deck controls based on steps in an electronic checklist (ECL). In one aspect, a computer-implemented method for cueing flight deck controls based on steps in an ECL includes displaying the ECL on an aircraft display that includes one or more steps involving controls on the flight deck. A step from the ECL is highlighted on the aircraft display and an indication indicating that the step has been completed is received. Upon receiving the indication, a next step in the ECL is highlighted. In various embodiments, flight deck visual indicators associated with the controls may be activated corresponding to steps in the ECL.

15 Claims, 6 Drawing Sheets

FLIGHT DECK CONTROL CUEING

FIELD OF THE DISCLOSURE

The present disclosure relates generally to electronic checklists in aircraft, and in particular to minimizing errors associated with electronic checklists.

BACKGROUND

In modern aircraft, pilots may utilize an electronic checklist (ECL) that is displayed on a multi-function display (MFD). Many control actions required by the ECL have to be performed by the pilot using controls throughout the flight deck. Although the ECL mentions the control by name, the pilot needs to physically engage the control to perform the step listed in the ECL.

Currently, for the pilot to perform the step listed in the ECL, the pilot needs to read the name of the control on the ECL, find the control on the flight deck, and move the particular control to the required position. However, it is possible that, due to human error, the pilot selects the wrong control on the flight deck, and/or moves the control to the wrong position. These errors may lead to failing to solve the existing aircraft problem, and/or causing a new problem.

It is with respect to these considerations and others that the disclosure made herein is presented.

SUMMARY

Technologies are described herein for cueing a pilot to controls on a flight deck based on steps in an electronic checklist (ECL). In one aspect, a computer-implemented method includes displaying an ECL on an aircraft display. The ECL includes one or more steps involving controls on the flight deck. A step from the ECL is highlighted on the aircraft display and an indication indicating that the step has been completed is received. Upon receiving the indication, a next step in the ECL is highlighted.

In another aspect, a system for cueing a pilot to controls on a flight deck based on steps of an ECL includes a flight deck control panel having one or more controls and visual indicators associated with each of the controls. The system also includes a memory for storing a program containing computer-executable instructions for cueing the one or more controls based on the steps in the ECL and a processor functionally coupled to the memory that is configured to display the ECL on an aircraft display. The processor also activates the visual indicator that is associated with the control corresponding to a highlighted step in the ECL and receives an indication indicating that the step has been completed.

It should be appreciated that the above-described subject matter may also be implemented in various other embodiments without departing from the spirit of the disclosure. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
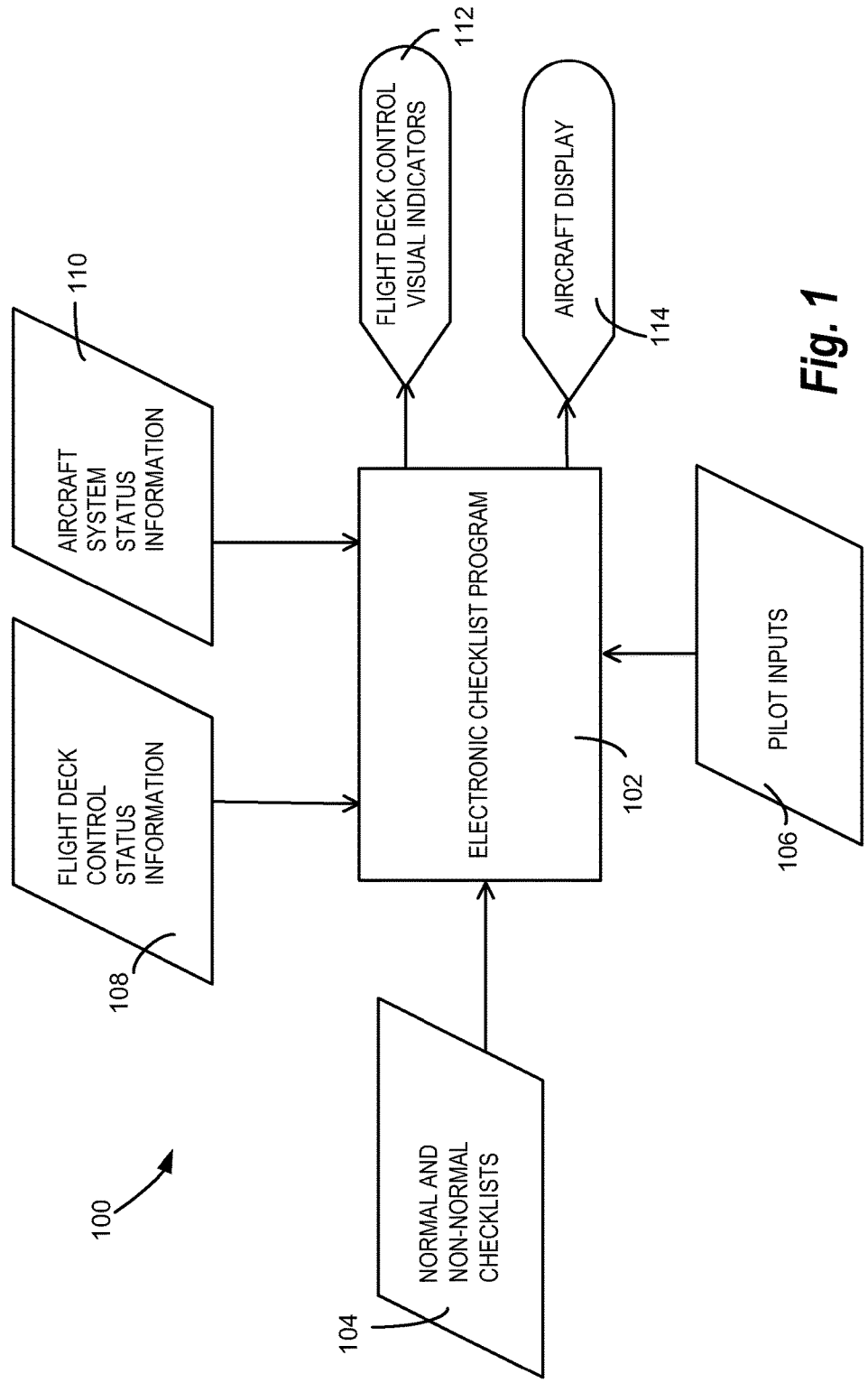
FIG. 1 is a data architecture diagram showing various aspects of an electronic checklist system of an aircraft, according to embodiments presented herein.

The following detailed description is directed to methods, systems and computers for cueing a pilot to controls on a flight deck based on steps in an electronic checklist (ECL). The ECL, in the context of an aircraft, is a checklist that contains a sequence of one or more steps that are to be performed by the pilot, for various reasons, such as to ensure the proper functioning of aircraft systems, to ensure the proper positioning of flight deck controls within the flight deck for various phases of flight, and the like. The ECL may be a normal checklist that is utilized for normal routine procedures, such as a take-off or landing. Alternatively, the ECL may be a non-normal checklist that is utilized when the aircraft experiences a non-normal condition, such as a fire in an engine.

Utilizing the concepts and technologies described herein, pilots may be cued to perform specific operations on controls on the flight deck. Controls on the flight deck may include dedicated hardware controls, mechanical controls, such as levers, control knobs, and switches, and multifunction controls, such as touch screen devices. A dedicated hardware control may be a mechanically operated control, such as a thrust lever, a flap handle, a fuel control switch and the like that performs one or more related functions. A multifunction control may be a software control that performs any number of related or unrelated functions, such as an electronic display with touch panel control capability, computer screen buttons controlled by mouse selection, and the like. Further, the ECL may be able to determine whether the pilot has completed the step, and alert the pilot in the event that the pilot incorrectly completed any of the steps contained in the ECL. In this way, errors may be minimized and the time taken to perform the steps contained in the ECL may also be reduced. These and other advantages and features will become apparent from the description of the various embodiments below.

In the following detailed description, references are made to the accompanying drawings that form a part hereof and that show by way of illustration, specific embodiments or examples. In referring to the drawings, like numerals represent like elements throughout the several figures.

FIG. 1 is a data architecture diagram that shows various aspects of an aircraft electronic checklist (ECL) system 100 of an aircraft. The aircraft ECL system 100 may include algorithms, application modules and programs for performing the various operations described herein. According to embodiments, the aircraft ECL system 100 includes an electronic checklist program 102. The electronic checklist program 102 displays ECLs on a display of the aircraft and cues a pilot to controls on the flight deck control panel according to steps contained in the ECL. As will be described below, the electronic checklist program 102 may be implemented as software or hardware capable of receiving and interpreting data as described herein for display within an aircraft or other vehicle. Information received by the electronic checklist program 102 may include, but is not limited to the electronic checklist information 104, pilot inputs 106, flight deck control status information 108, and aircraft system status information 110. In addition, the electronic checklist program 102 may utilize one or more flight deck control visual indicators 112 on the flight deck to cue the pilot to the controls. The electronic checklist program 102 may also display information pertaining to ECLs and the status of flight deck controls on an aircraft display 114. Details regarding the aircraft display 114 are provided below in regard to FIG. 2.

Figure 2:
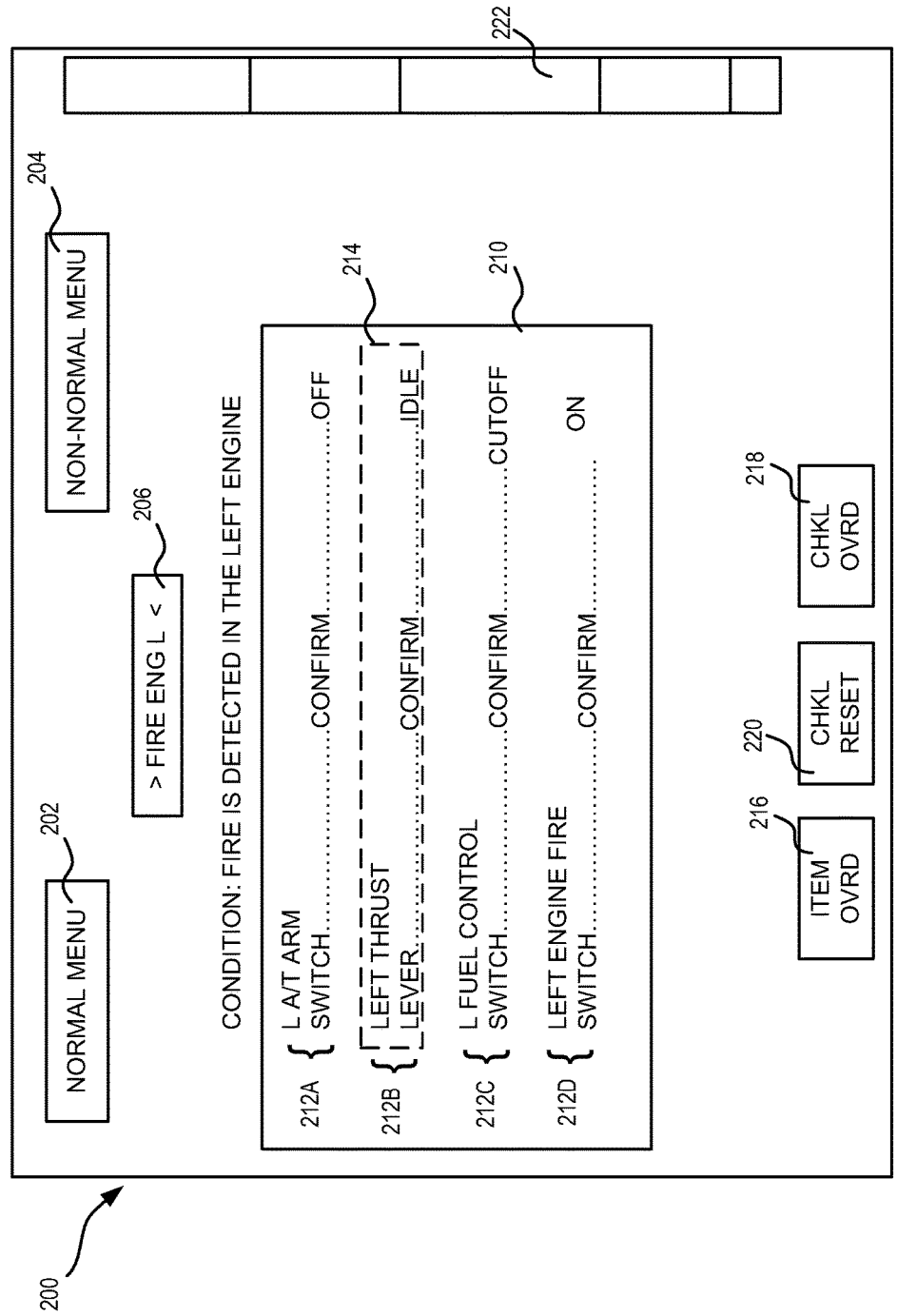
FIG. 2 is a screen image of an aircraft display displaying an electronic checklist, according to embodiments presented herein.

Referring now to FIG. 2, a screen image of an aircraft display 114, such as a multi-function display (MFD) 200 of an aircraft, is shown. The MFD 200 displays an ECL 210, including one or more steps 212A-212D (also referred to herein generally as step 212). The steps 212 may provide instructions to the pilot to perform operations at particular controls or other controls and operations of the aircraft. As shown in FIG. 2, the step 212A provides an instruction to the pilot to confirm whether a left auto-throttle arm control is in the OFF position, for example. Similarly, step 212B provides an instruction to the pilot to confirm whether a left thrust lever control is in the IDLE position and step 212C provides an instruction to the pilot to confirm that a left fuel control is at the CUTOFF position. Finally, step 212D provides an instruction to the pilot to confirm that a left engine fire control is in the ON position. The current action step 212B in the ECL 210 is highlighted on the display, as indicated by the dotted line 214, shown in FIG. 2. Other highlighting may be used, including, but not limited to, flashing text, bold text, brighter text, and the like.

As will be described below, upon successful completion of the current action step 212B, the highlighting may move to the next step 212C in the ECL 210 indicating that the pilot now needs to follow the instruction provided in that step. According to embodiments, if the electronic checklist program 102 determines that a step 212 has been completed incorrectly, the electronic checklist program 102 may issue a warning signal alerting the pilot that the step has not been correctly completed. The warning signal may be an audible attention getter, a visual attention getter on the MFD 200 and/or the flight deck control panel or may be both an audible and visual warning signal.

According to embodiments, the electronic checklist program 102 may be able to override or skip one or more steps 212 contained in the ECL 210. If the pilot wants to override or skip the highlighted step 212B on the MFD 200, the pilot may press an item override button 216 displayed near the bottom of the MFD 200. In this way, the electronic checklist program 102 may override this step 212B and skip to the next step 212C in the ECL 210. If the pilot desires to override the entire ECL 210, the pilot may press the checklist override button 218, which is also displayed near the bottom of the MFD 200. The MFD 200 also displays various other items, such as a normal checklist button 202, a non-normal checklist button 204, a current checklist indicator 206, and a checklist reset button 220. Further, the MFD 200 may also include a scroll bar 222, as shown in FIG. 2.

It should be appreciated that these items may be utilized to perform specific functions that are not germane to the present disclosure.

Figure 3A:
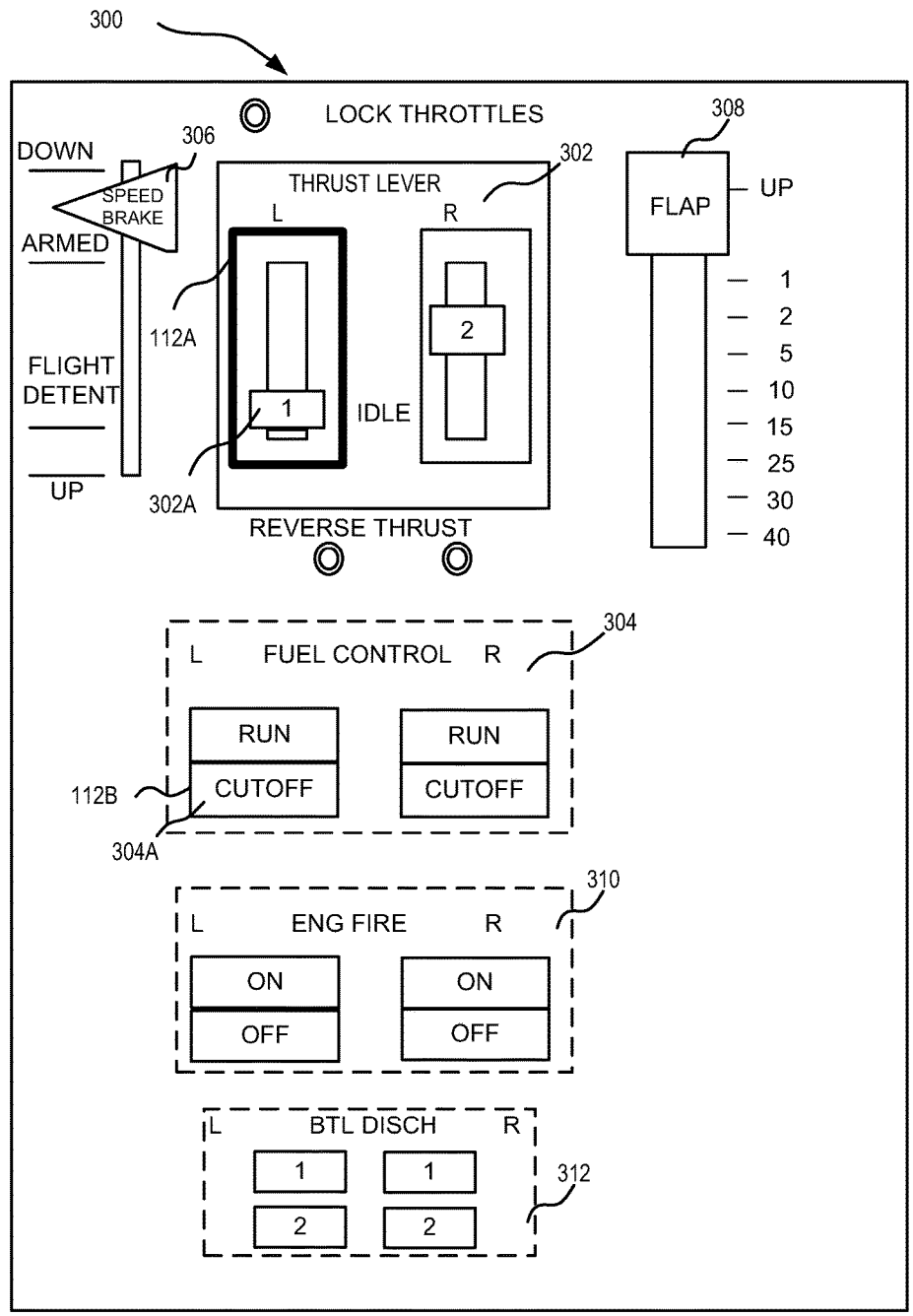
FIGS. 3A and 3B are diagrams illustrating a flight deck control panel including controls, according to embodiments presented herein.
Figure 3B:
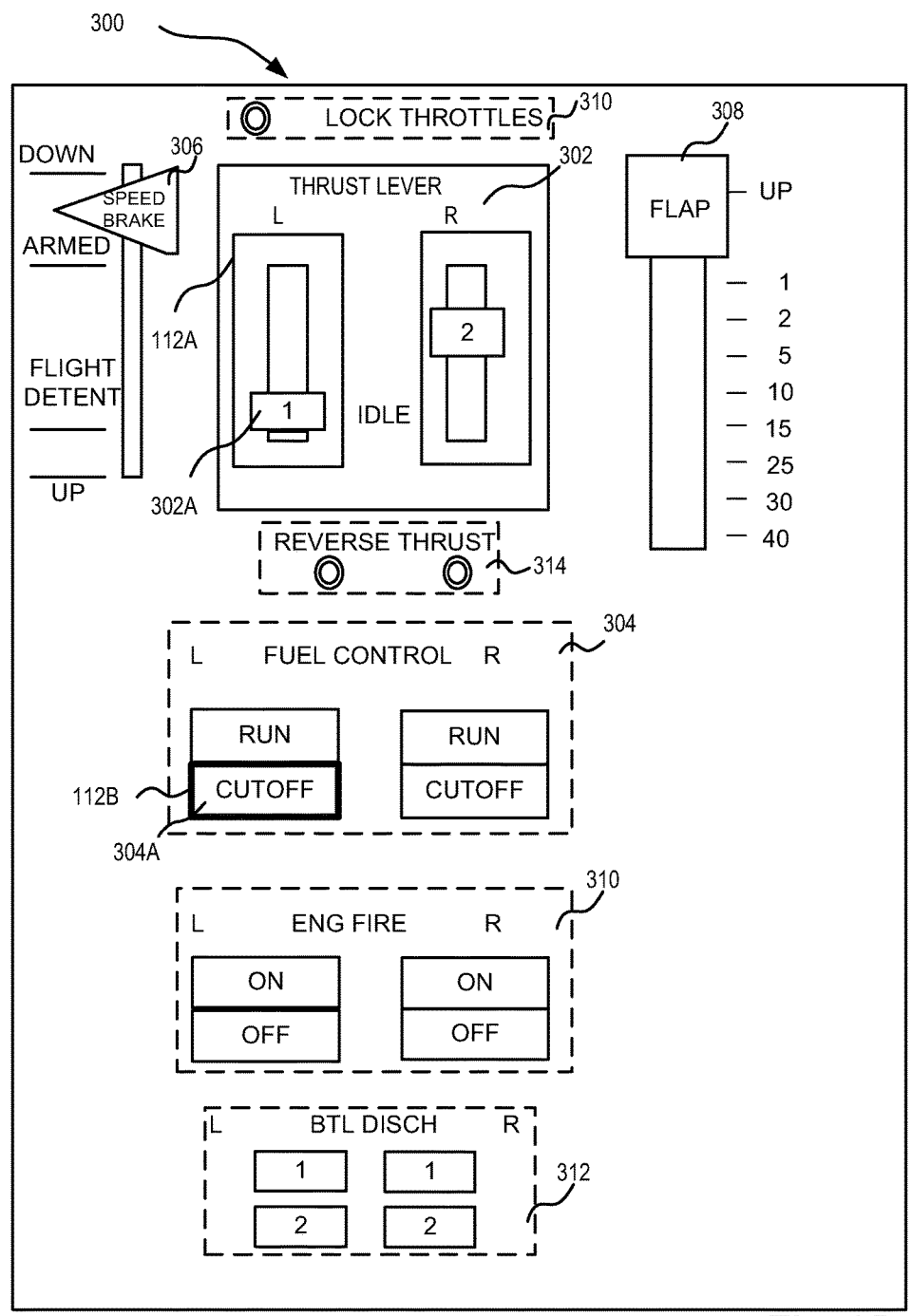

Referring now to FIGS. 3A and 3B, a diagram illustrating a flight deck control panel 300 including various controls 304A is shown. The flight deck control panel 300 may include different controls that may be utilized to perform specific operations. Examples of such controls that are shown in FIGS. 3A and 3B include left and right thrust lever controls 302, left and right fuel controls 304, a speed brake lever control 306, a flap lever control 308, left and right engine fire controls 310, left and right BTL DISCH controls 312, a reverse thrust indicator 314, and a lock throttles button 316. These controls may include various input options, such as on and off buttons, run and cutoff buttons and the like. These controls, and others that are associated with the ECL 210 may be located on one or more flight deck control panels situated within the flight deck. The flight deck control panel 300 may also include visual indicators associated with each of the controls on the flight deck control panel 300. FIG. 3A also displays a left thrust lever control 302A and a left fuel control 304A. In addition, FIGS. 3A and 3B show visual indicator 112A associated with the left thrust lever control 302A, and visual indicator 112B associated with the left fuel control 304A.

According to embodiments, the visual indicators 112A, 112B may be flashing lights, illuminated lights, or any other visual indicators that may attract a pilot's attention to associated controls on the flight deck control panel 300. Further, the visual indicators 112A, 112B may be located near or surround the control 302A, 304A, such that when a step 212 within the ECL 210 requires a pilot to perform an operation at a particular control, the pilot's attention is directed towards that particular control by means of the visual indicator. For example, step 212B, shown in FIG. 2 provides an instruction to the pilot to confirm that the left thrust lever control 302A is in the IDLE position. As shown in FIG. 3A, the visual indicator 112A associated with the left thrust lever control 302A is activated, indicating to the pilot that the left thrust lever control 302A is the control upon which an action needs to be taken.

As will be described in more detail below, if the pilot incorrectly positions the left thrust lever control 302A to a position other than IDLE, the electronic checklist program 102 may receive an indication from either the left thrust lever control 302A or an actuator associated with the left thrust lever control 302A indicating that the step 212B was completed incorrectly. Upon receiving the indication, the electronic checklist program 102 may issue a warning signal indicating that step 212B was completed incorrectly.

Alternatively, if the pilot correctly completes step 212B by placing the left thrust lever control 302A in the IDLE position, the electronic checklist program 102 may automatically receive an indication from either the left thrust lever control 302A or an actuator associated with the control indicating that the step 212B was completed correctly. The electronic checklist program 210 may then highlight the next step 212C in the ECL 210.

As shown in FIG. 3B, the flight deck control visual indicator 112B associated with the left fuel control 304A is activated. Step 212C in the ECL 210 provides the instruction to the pilot to confirm that the left fuel control 304A is in the CUTOFF position. The flight deck control visual indicator 112B remains activated until the pilot positions the left fuel control 304A in the CUTOFF position. Once the electronic checklist program 102 receives an indication that the step 212C has been completed, the electronic checklist program 102 will scroll to the next step 212D in the ECL 210. In this way, the pilot may not have to manually inform the electronic checklist program 102 that a step 212 has been completed and scroll to the next step in the ECL 210. It should be appreciated that the electronic checklist program 102 may be able to directly control the activation and deactivation of the flight deck control visual indicators 112 associated with the controls 302A, 304A on the flight deck control panel 300.

Figure 4:
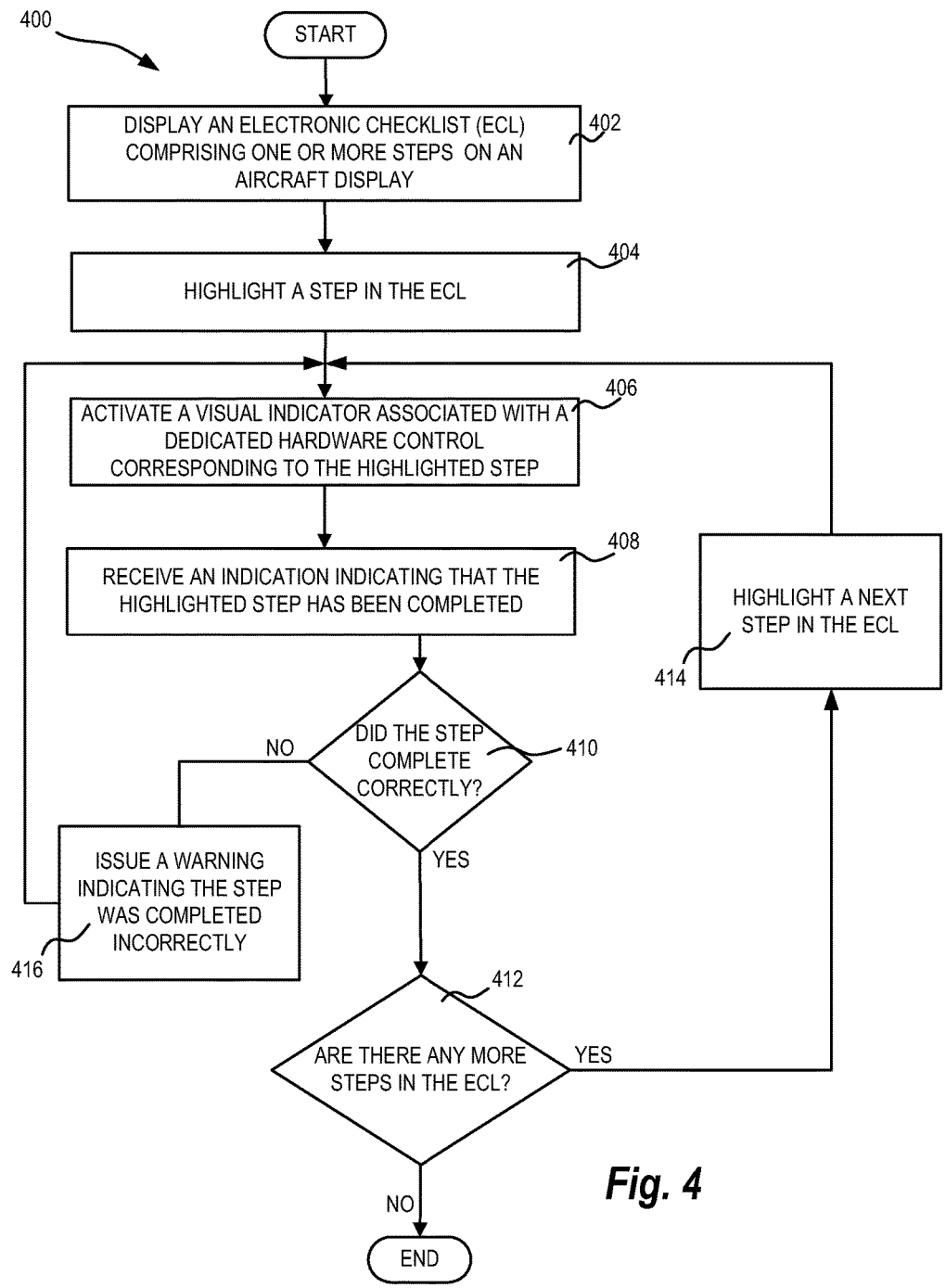
FIG. 4 is a logical flow diagram illustrating a routine for cueing a pilot to controls associated with steps in an electronic checklist, according to embodiments presented herein.

Turning now to FIG. 4, additional details will be provided regarding embodiments presented herein for cueing a pilot to controls on a flight deck based on steps in an ECL. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

FIG. 4 is a logical flow diagram illustrating a routine 400 for cueing a pilot to controls associated with steps in an ECL. The routine 400 begins at operation 402, where the electronic checklist program 102 displays an ECL, such as the ECL 210 shown in FIG. 2, on the aircraft display 114. The aircraft display 114 may be the MFD 200, an electronic flight bag (EFB), or any other display that is able to display the ECL 210 on the flight deck of the aircraft. From operation 402, the routine 400 proceeds to operation 404, where the electronic checklist program 102 highlights a step in the ECL 210. As shown in FIG. 2, step 212B is highlighted by displaying the dotted line 214 around the step 212B. As described above, the highlighted step 212B provides an instruction to the pilot to confirm whether the left thrust lever control 302A is in the IDLE position.

Once the electronic checklist program 102 highlights the step 212B on the aircraft display 114, the routine 400 proceeds from operation 404 to operation 406, where the electronic checklist program 102 activates a visual indicator 112A on the control panel 300 associated with the left thrust lever control 302A corresponding to the highlighted step 212B.

From operation 406, the routine 400 proceeds to operation 408, where the electronic checklist program 102 receives an indication indicating that the highlighted step 212B has been completed. According to embodiments, the electronic checklist program 102 may receive an indication directly from the control, indicating the position or setting of the control. For example, the left thrust lever control 302A may send an indication to the electronic checklist program 102 indicating that the left thrust lever control 302A is at the IDLE position. Alternatively, the electronic checklist program 102 may receive aircraft system status information 110 from the appropriate aircraft system controlled by the control that the step in the ECL has been completed correctly. For instance, the aircraft system responsible for calculating the thrust of the left engine may send an indication to the electronic checklist program 102 indicating that the left thrust lever is in the IDLE position, and therefore, confirming that the step 212B has been completed correctly.

From operation 408, the routine 400 proceeds to decision box 410, where the electronic checklist program 102 determines whether the highlighted step 212B is completed correctly. If, at decision box 410, the electronic checklist program 102 determines that the highlighted step 212B was completed incorrectly, the routine 400 proceeds to operation 416, where the electronic checklist program 102 issues a warning signal indicating that the step was completed incorrectly. The warning signal may be a visual signal, like a flashing screen, a warning sign appearing on the MFD, or an audible attention getter, such as a beep or an announcement. In some embodiments, both visual and audible warning signals may be made by the electronic checklist program 102. From operation 416, the routine returns to operation 406, where the visual indicator 112A associated with the control 302A is reactivated.

At decision box 410, if the electronic checklist program 102 determines that the step 212B has been completed correctly, the routine 400 proceeds to decision box 412, where the electronic checklist program 102 determines whether there are any more steps in the ECL 210. If there are more steps in the ECL 210, the routine 400 proceeds to operation 414, where the electronic checklist program 102 highlights the next step 212C in the ECL. From operation 414, the routine 400 proceeds back to operation 406, where the visual indicator 112B associated with the control 304A for the next step 212C is activated. If, at decision box 412, there are no more steps 212 to be completed in the ECL 210, the routine 400 ends.

Figure 5:
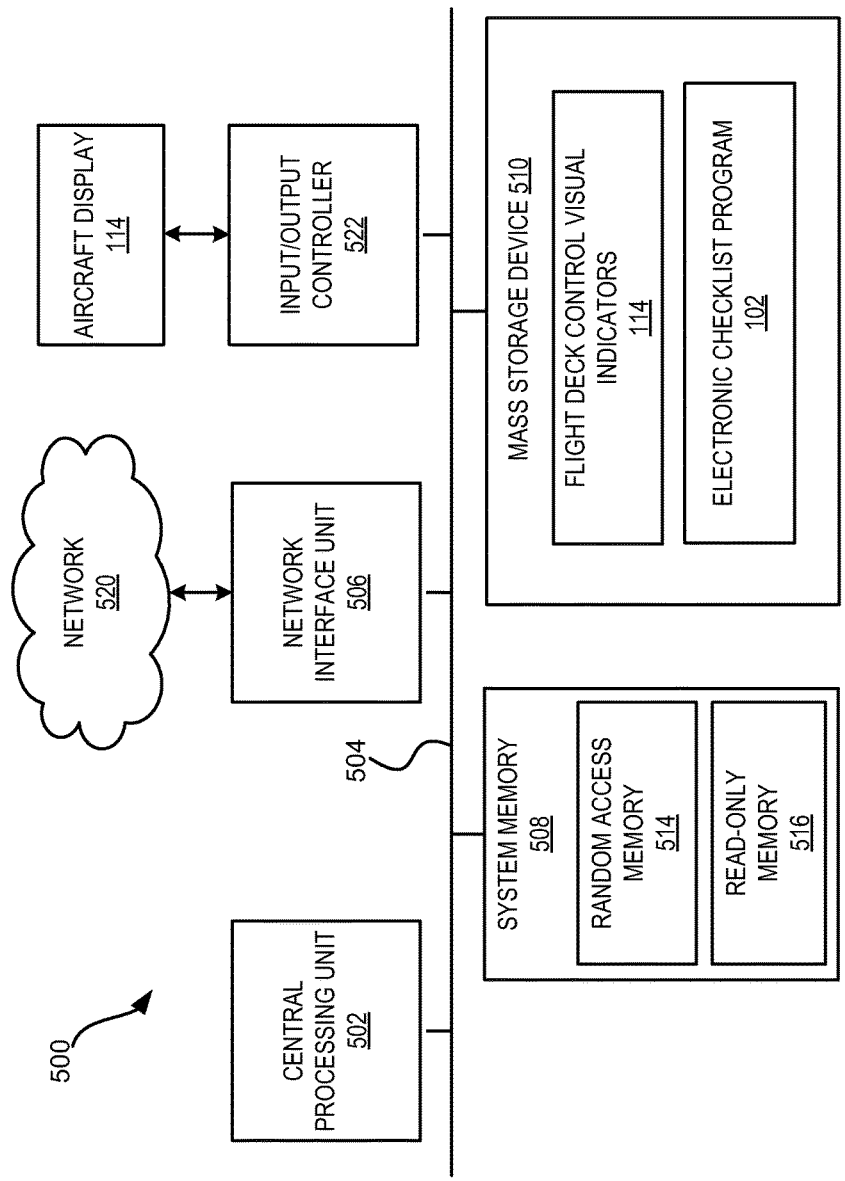
FIG. 5 is a block diagram showing an illustrative computer hardware and software architecture for a computing system capable of implementing aspects of the embodiments presented herein.

FIG. 5 shows an illustrative computer architecture 500 capable of executing the software components described herein for cueing a pilot to controls on a flight deck based on steps in an ECL, in the manner presented above. The computer architecture 500 includes a central processing unit 502 (CPU), a system memory 508, including a random access memory 514 (RAM) and a read-only memory 516 (ROM), and a system bus 504 that couples the memory to the CPU 502.

The CPU 502 is a standard programmable processor that performs arithmetic and logical operations necessary for the operation of the computer architecture 500. The CPU 502 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer architecture 500 also includes a mass storage device 510 for storing an operating or control system, as well as specific application modules or other program modules, such as the electronic checklist program 102 described above in regard to FIG. 1. The mass storage device 510 is connected to the CPU 502 through a mass storage controller (not shown) connected to the bus 504. The mass storage device 510 and its associated computer-readable media provide non-volatile storage for the computer architecture 500.

The computer architecture 500 may store data on the mass storage device 510 by transforming the physical state of the mass storage device to reflect the information being stored. The specific transformation of physical state may depend on various factors, in different implementations of this description. Examples of such factors may include, but are not limited to, the technology used to implement the mass storage device 510, whether the mass storage device is characterized as primary or secondary storage, and the like. For example, the computer architecture 500 may store information to the mass storage device 510 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer architecture 500 may further read information from the mass storage device 510 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer storage media that can be accessed by the computer architecture 500. By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture 500.

According to various embodiments, the computer architecture 500 may operate in a networked environment using logical connections to other aircraft systems and remote computers through a network, such as the network 520. The computer architecture 500 may connect to the network 520 through a network interface unit 506 connected to the bus 504. It should be appreciated that the network interface unit 506 may also be utilized to connect to other types of networks and remote computer systems. The computer architecture 500 may also include an input-output controller 522 for receiving and processing input from a number of other devices, including a control display unit, an EFIS control panel, a keyboard, mouse, electronic stylus, or touch screen that may be present on a connected aircraft display 112. Similarly, the input-output controller 522 may provide output to the aircraft display 112, a printer, or other type of output device. According to embodiments, the aircraft display 112 may be the MFD 200, an EFB or other display device capable of displaying an ECL in the aircraft.

Based on the foregoing, it should be appreciated that technologies for cueing a pilot to controls on a flight deck based on steps in an ECL are provided herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for cueing a pilot to controls on a flight deck control panel based on steps in an electronic checklist (ECL), comprising:
    displaying the ECL on an aircraft display, the ECL comprising one or more steps involving the controls on the flight deck control panel;
    highlighting a current step of the one or more steps in the ECL on the aircraft display by surrounding text of the current step by a dotted line;
    receiving an indication corresponding to the current step indicating that the current step has been completed;
    upon receiving the indication that the current step has been completed, issuing a verbal warning announcement if the current step was completed incorrectly; and
    highlighting a next step of the one or more steps in the ECL by surrounding text of the next step by a dotted line.

2. The computer-implemented method of claim 1, wherein receiving an indication corresponding to the current step indicating that the current step has been completed comprises receiving an indication from a physical actuator associated with the control that an action has been completed.

3. The computer-implemented method of claim 1, further comprising, concurrently with displaying the one or more steps of the ECL, also displaying a checklist override button.

4. The computer-implemented method of claim 1, further comprising presenting a current checklist indicator which provides a textual description of the condition relating to the checklist.

5. The computer-implemented method of claim 1, wherein receiving the indication corresponding to the current step indicating that the current step has been completed comprises receiving an indication from an aircraft system controlled by a control that an action has been completed.

6. A system for cueing a pilot to controls based on steps in an electronic checklist (ECL), comprising:
    a flight deck control panel comprising one or more controls, each of the one or more controls having a visual indicator associated with the control, the ECL comprising one or more steps involving the controls;
    a memory for storing a program containing computer-executable instructions for cueing the pilot to the one or more controls based on the steps in the ECL; and
    a processor functionally coupled to the memory, the processor being responsive to the computer-executable instructions contained in the program and configured to:
        display the ECL on an aircraft display and highlight a current step in the ECL by surrounding text of the step by a dotted line,
        activate the visual indicator associated with the control corresponding to the current step in the ECL, receive an indication corresponding to the current step indicating that the current step has been completed, and upon receiving the indication indicating that the current step has been completed, issue a verbal warning announcement if the current step was completed incorrectly.

7. The system of claim 6, and further comprising a physical actuator associated with and responsive to a control of the flight deck control panel, the physical actuator providing to the processor an indication that an action has been completed.

8. The system of claim 6, and further comprising an aircraft system controlled by a control of the flight deck control panel, the aircraft system providing to the processor an indication that an action has been completed.

9. The system of claim 6 wherein the processor is further responsive to the computer-executable instructions contained in the program to, concurrently with displaying the one or more steps of the ECL, also display a checklist override button.

10. The system of claim 6 wherein the processor is further responsive to the computer-executable instructions contained in the program to provide a current checklist indicator which provides a textual description of the condition relating to the checklist.

11. A computer-readable medium having computer-executable instructions stored thereon that when executed by a computer, causes the computer to:

display an electronic checklist (ECL) on an aircraft display by highlighting a current step in the ECL by surrounding the current step by a dotted line, the ECL comprising one or more steps involving one or more controls;

activate a visual indicator associated with the one or more controls corresponding to a current step in the ECL;

receive an indication corresponding to the current step indicating that the current step has been completed; and upon receiving the indication indicating that the current step has been completed incorrectly, issue a verbal warning announcement.

12. The computer-readable medium of claim 11, having additional computer-executable instructions that further cause the computer to receive an indication that an action has been completed from a physical actuator associated with and responsive to a control of the flight deck control panel.

13. The computer-readable medium of claim 11, having additional computer-executable instructions that further cause the computer to receive an indication that an action has been completed from an aircraft system associated with and responsive to a control of the flight deck control panel.

14. The computer-readable medium of claim 11, having additional computer-executable instructions that further cause the computer to provide a current checklist indicator which provides a textual description of the condition relating to the checklist.

15. The computer-readable medium of claim 11, having additional computer-executable instructions that further cause the computer to, concurrently with displaying the one or more steps of the ECL, also display a checklist override button.

* * * * *